United States Patent
Kuusela et al.

(10) Patent No.: US 10,798,402 B2
(45) Date of Patent: Oct. 6, 2020

(54) SAME FRAME MOTION ESTIMATION AND COMPENSATION

(71) Applicant: GOOGLE LLC, Mountain View, CA (US)

(72) Inventors: Aki Kuusela, Palo Alto, CA (US); Dake He, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 273 days.

(21) Appl. No.: 15/845,161

(22) Filed: Dec. 18, 2017

(65) Prior Publication Data

US 2019/0124349 A1  Apr. 25, 2019

Related U.S. Application Data

(60) Provisional application No. 62/576,274, filed on Oct. 24, 2017.

(51) Int. Cl.
*H04N 19/513* (2014.01)
*H04N 19/70* (2014.01)
(Continued)

(52) U.S. Cl.
CPC ......... *H04N 19/513* (2014.11); *H04N 19/107* (2014.11); *H04N 19/14* (2014.11);
(Continued)

(58) Field of Classification Search
None
See application file for complete search history.

(56) References Cited

U.S. PATENT DOCUMENTS 10,284,869 B2 * 5/2019 Han .................. H04N 19/51
10,462,457 B2 * 10/2019 Xu .................... H04N 19/109
(Continued)

FOREIGN PATENT DOCUMENTS

WO   2015/196117 A1   12/2015
WO   2016/196843 A1   12/2016

OTHER PUBLICATIONS

Bankoski, et al., "Technical Overview of VP8, An Open Source Video Codec for the Web", Jul. 11, 2011, 6 pp.
(Continued)

*Primary Examiner* — Tyler W. Sullivan
(74) *Attorney, Agent, or Firm* — Young Basile Hanlon & MacFarlane, P.C.

(57) ABSTRACT

Motion estimation or compensation functionality of a hardware component is used to encode or decode key frames and other video frames. The hardware component includes a memory, which may, for example, be a local static random access memory or an external dynamic random access memory. Upon a block of a frame being encoded or decoded, data associated with that block is stored in the memory. That data can then be processed by motion estimation or motion compensation for use in encoding or decoding one or more later blocks within the same frame. The data may, for example, be stored in the memory after operations for reconstruction and loop filtering have been performed. The data stored in the memory may effectively be processed using traditional inter-prediction operations, such as to identify similar video objects within blocks of the same frame.

18 Claims, 11 Drawing Sheets

(51) Int. Cl.
*H04N 19/14* (2014.01)
*H04N 19/423* (2014.01)
*H04N 19/433* (2014.01)
*H04N 19/593* (2014.01)
*H04N 19/176* (2014.01)
*H04N 19/107* (2014.01)

(52) U.S. Cl.
CPC ......... *H04N 19/176* (2014.11); *H04N 19/423* (2014.11); *H04N 19/433* (2014.11); *H04N 19/593* (2014.11); *H04N 19/70* (2014.11)

(56) References Cited

U.S. PATENT DOCUMENTS

| | | | |
|---|---|---|---|
| 2004/0252759 A1* | 12/2004 | Winder | H04N 19/537 375/240.12 |
| 2013/0271565 A1* | 10/2013 | Chen | |
| 2015/0055706 A1* | 2/2015 | Xu | H04N 19/105 375/240.16 |
| 2015/0296213 A1* | 10/2015 | Hellman | H04N 19/44 375/240.01 |
| 2015/0373362 A1* | 12/2015 | Pang | H04N 19/176 375/240.16 |
| 2016/0105670 A1* | 4/2016 | Pang | H04N 19/105 375/240.16 |
| 2016/0142697 A1* | 5/2016 | Budagavi | H04N 13/156 348/43 |
| 2016/0227238 A1* | 8/2016 | Wu | H04N 19/436 |
| 2016/0344903 A1* | 11/2016 | Zhou | H04N 19/523 |
| 2016/0360234 A1* | 12/2016 | Tourapis | H04N 19/176 |
| 2017/0099495 A1* | 4/2017 | Rapaka | H04N 19/513 |
| 2017/0127090 A1* | 5/2017 | Rosewarne | H04N 19/159 |
| 2018/0007364 A1* | 1/2018 | Noraz | H04N 19/182 |
| 2018/0041769 A1* | 2/2018 | Chuang | H04N 19/513 |
| 2018/0192071 A1* | 7/2018 | Chuang | H04N 19/517 |
| 2018/0199052 A1* | 7/2018 | He | H04N 19/176 |

OTHER PUBLICATIONS

Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
Xiaoyu Xiu, et al., "On unification framework of intra block copy", Joint Collaborative Team on Video Coding (JCT-VC) of ITU-T SG 16 WP 3 and ISO/IEC JTC 1/SC 29/WG 11, 21st Meeting: Warsaw, PL, Jun. 19-26, 2015, Doc. JCTVC-U104 (Jun. 10, 2015), 6 pgs.
Chao Pang et al., "Non-CE2 Test1: Intra block copy and inter signalling unification", Joint Collaborative Team on Video Coding (JCT-VC) of ITU-T SG 16 WP 3 and ISO/IEC JTC 1/SC 29/WG 11, 20th Meeting: Geneva, CH, Feb. 10-18, 2015, Doc. JCTVC-T0227 (Feb. 15, 2015), 3 pgs.
International Search Report and Written Opinion in PCT/US2018/040803, dated Aug. 24, 2018, 14 pgs.

* cited by examiner

SAME FRAME MOTION ESTIMATION AND COMPENSATION

CROSS REFERENCE TO RELATED APPLICATION(S)

This disclosure claims the benefit of U.S. Provisional Application No. 62/576,274, filed Oct. 24, 2017, the disclosure of which is hereby incorporated by reference in its entirety.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for encoding a current block of a video frame according to an implementation of this disclosure comprises identifying a first set of motion vector candidates by performing motion estimation based on first data stored in a memory. The first data is associated with one or more encoded blocks preceding the current block within the video frame and is stored in the memory subsequent to an encoding of the one or more encoded blocks. The method further comprises identifying a second set of motion vector candidates by performing inter-prediction against at least one encoded block of at least one previously encoded video frame. The method further comprises selecting at least one motion vector from at least one of the first set of motion vector candidates or the second set of motion vector candidates. The method further comprises determining a prediction residual block for the current block using a prediction block generated based on the selected at least one motion vector. The method further comprises transforming the prediction residual block to produce transform coefficients. The method further comprises quantizing the transform coefficients to produce quantization coefficients. The method further comprises reconstructing the quantization coefficients to produce a reconstructed current block. The method further comprises storing second data in the memory for use in encoding a video block following the current block within the video frame. The second data is indicative of a video object associated with the reconstructed current block.

An apparatus for encoding a current block of a video frame according to an implementation of this disclosure comprises a processor configured to execute instructions stored in a non-transitory storage medium. The instructions include instructions to identify a first set of motion vector candidates by performing motion estimation based on first data stored in a memory. The first data is associated with one or more encoded blocks preceding the current block within the video frame and is stored in the memory subsequent to an encoding of the one or more encoded blocks. The instructions further include instructions to identify a second set of motion vector candidates by performing inter-prediction against at least one encoded block of at least one previously encoded video frame. The instructions further include instructions to select at least one motion vector from at least one of the first set of motion vector candidates or the second set of motion vector candidates. The instructions further include instructions to determine a prediction residual block for the current block using a prediction block generated based on the selected at least one motion vector. The instructions further include instructions to transform the prediction residual block to produce transform coefficients. The instructions further include instructions to quantize the transform coefficients to produce quantization coefficients. The instructions further include instructions to reconstruct the quantization coefficients to produce a reconstructed current block. The instructions further include instructions to store second data in the memory for use in encoding a video block following the current block within the video frame. The second data is indicative of a video object associated with the reconstructed current block.

A method for decoding an encoded block of an encoded video frame from a bitstream according to an implementation of this disclosure comprises decoding one or more syntax elements from the bitstream. The one or more syntax elements indicate to decode the encoded block by performing motion compensation against one or more reconstructed blocks of the encoded video frame. The method further comprises decoding at least one motion vector from the bitstream and performing motion compensation based on first data stored in a memory. The first data is associated with the one or more reconstructed blocks. The first data is stored in the memory subsequent to a reconstruction of the one or more reconstructed blocks. The method further comprises generating a prediction block using the decoded at least one motion vector. The method further comprises dequantizing coefficients of the encoded block to produce dequantization coefficients. The method further comprises inverse transforming the dequantization coefficients to reconstruct a prediction residual block. The method further comprises combining the prediction residual block and the prediction block to produce a reconstructed block. The method further comprises storing second data in the memory for use in decoding a video block following the encoded block within the encoded video frame. The second data is indicative of a video object associated with the reconstructed block.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
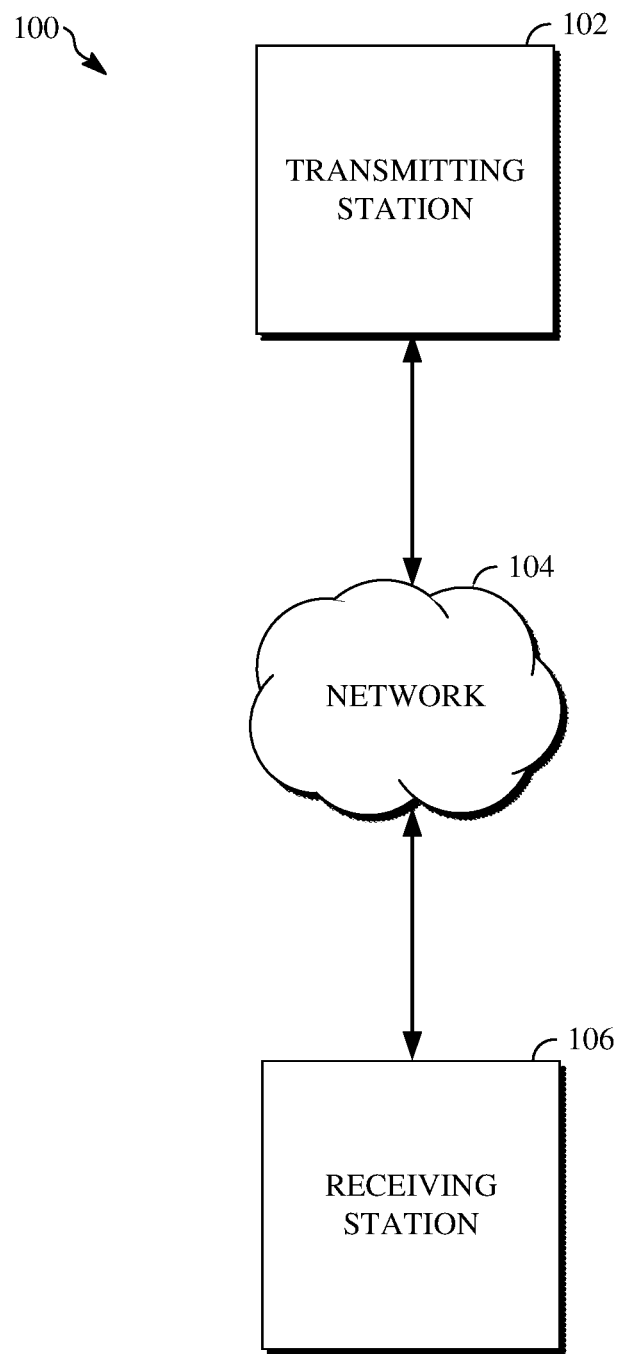
FIG. 1 is a schematic of a video encoding and decoding system.

Video compression schemes may include breaking respective images, or frames, into smaller portions, such as blocks, and generating an output bitstream using techniques to limit the information included for respective blocks in the output. An encoded bitstream can be decoded to re-create the source images from the limited information. Typical video compression and decompression techniques use regular motion compensation, which use inter-frame redundancies to predict motion based on temporal similarities between video frames or intra-frame redundancies to predict motion based on spatial similarities within individual video frames.

In some cases, a hardware component may be configured to encode an input video stream including frames into a compressed bitstream and/or to decode a compressed bitstream into an output video stream for display. The hardware component may, for example, include functionality for predicting motion during encoding and/or decoding, such as by leveraging motion estimation or compensation to identify inter-frame redundancies. Motion estimation and compensation, and thus inter-prediction operations, are typically used only to predict motion against data of other frames. However, a video sequence may include frames that cannot be predicted using other frames.

For example, the video sequence may include one or more key frames that may include video objects distinct from other frames. A key frame may, for example, be the first frame in a video sequence, a first frame associated with a new scene displayed in a video sequence, a frame to which a viewer of a video sequence has skipped or jumped to, or the like. The entire image of a key frame is typically encoded to a compressed bitstream since it may not be otherwise identifiable, such that portions of the key frame may be lost if not encoded. A key frame may thus require more bandwidth and power to encode or decode than other types of frames. In cases where a hardware component is used, the motion estimation or compensation functionality may be idle during the processing of a key frame. This is because the key frame is not encoded or decoded using inter-frame redundancies.

Implementations of this disclosure include using motion estimation or compensation functionality of a hardware component to encode or decode key frames and other video frames. The hardware component includes a memory (e.g., a local static random access memory (SRAM), a dynamic random access memory (DRAM), or the like). Upon a block of a frame being encoded or decoded, data associated with that block is stored in the memory. That data can then be processed by motion estimation (e.g., during encoding) or motion compensation (e.g., during decoding) for use in encoding or decoding one or more later blocks within the same frame. The data may, for example, be stored in the memory after operations for reconstruction and loop filtering have been performed against the block during the encoding or decoding. The data stored in the memory may effectively be processed using traditional inter-prediction operations, such as to identify similar video objects within blocks of the same frame.

By storing the data in a local static memory and using that stored data to predict data for later blocks of the same frame, for example, the hardware component does not have to access an external memory. The implementations of this disclosure may therefore reduce the amount of bandwidth and power otherwise required to encode or decode video data using a hardware component. However, in some implementations where the data used to encode or decode a block is stored in an external memory (e.g., an external DRAM), those implementations may still reduce an amount of bandwidth and power otherwise required for encoding or decoding, such as where the data stored in such external DRAM or like memory is used to encode or decode a key frame. Although such a result may be easily recognizable when processing key frames, the implementations of this disclosure provide code benefits for processing other types of frames, as well. For example, the resources required for processing non-key frames that include abrupt changes in content, lighting, fast motion, or the like may also be reduced using the implementations of this disclosure.

Further details of techniques for using motion estimation or compensation functionality of a hardware component to encode or decode key frames and other video frames are described herein with initial reference to a system in which they can be implemented. FIG. 1 is a schematic of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
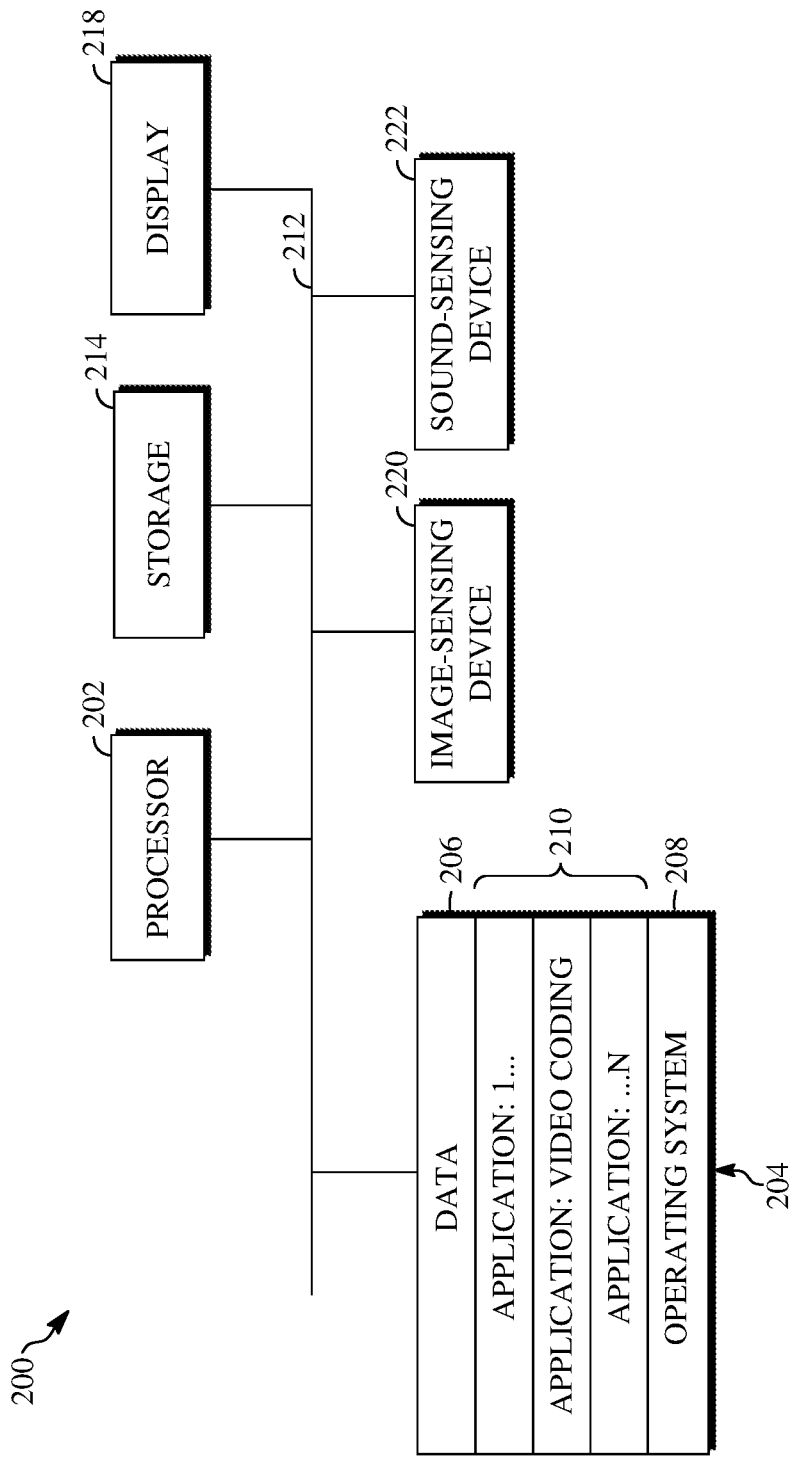
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
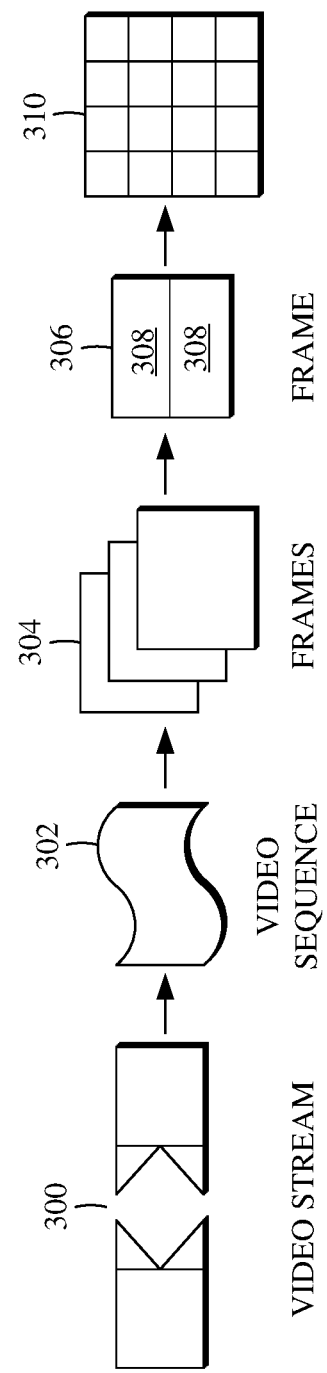
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
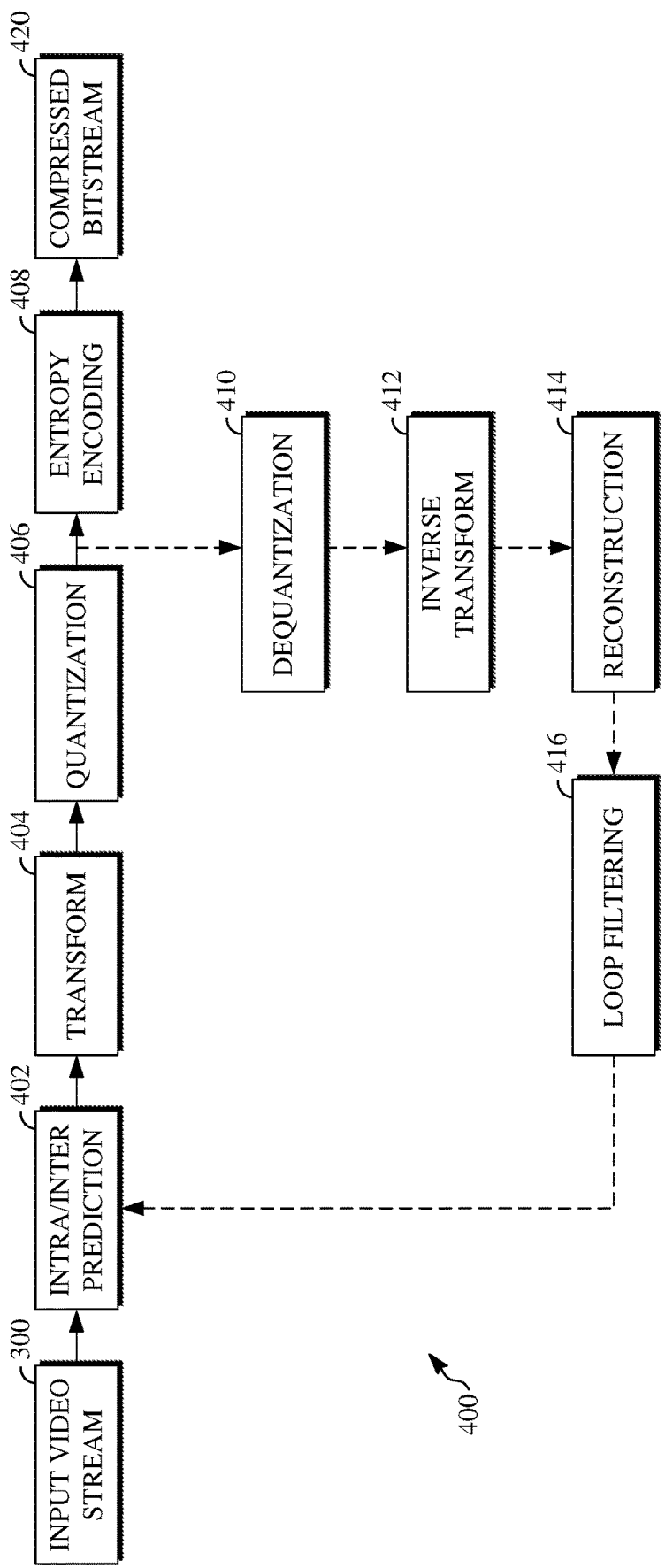
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual or prediction residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
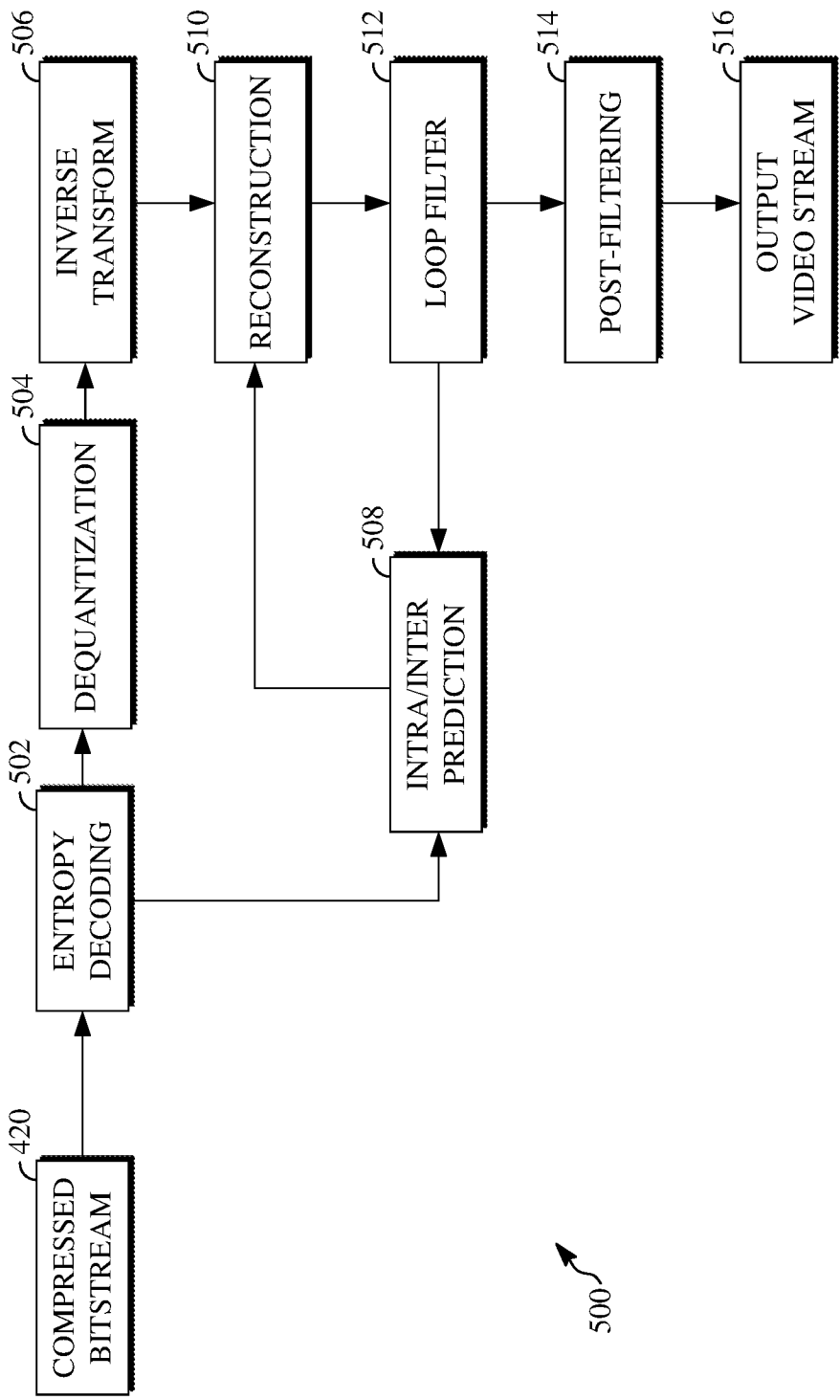
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and an optional post-filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts (e.g., using deblocking filtering, sample adaptive offset filtering, or the like, or a combination thereof). Other filtering can be applied to the reconstructed block. In this example, the post-filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the post-filtering stage 514.

Figure 6:
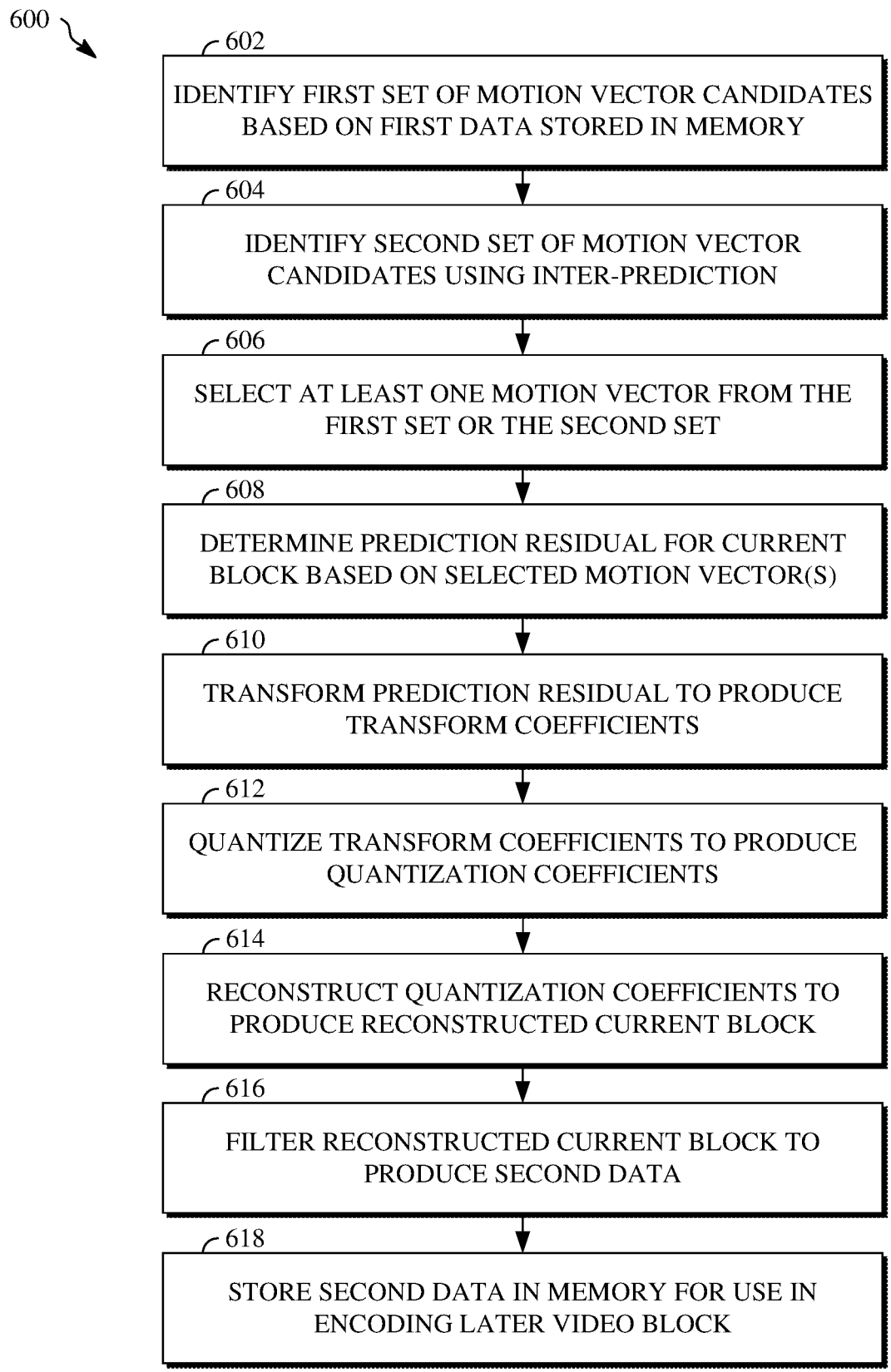
FIG. 6 is a flowchart diagram of an example of a technique for encoding a current block of a video frame using same frame motion estimation.
Figure 7:
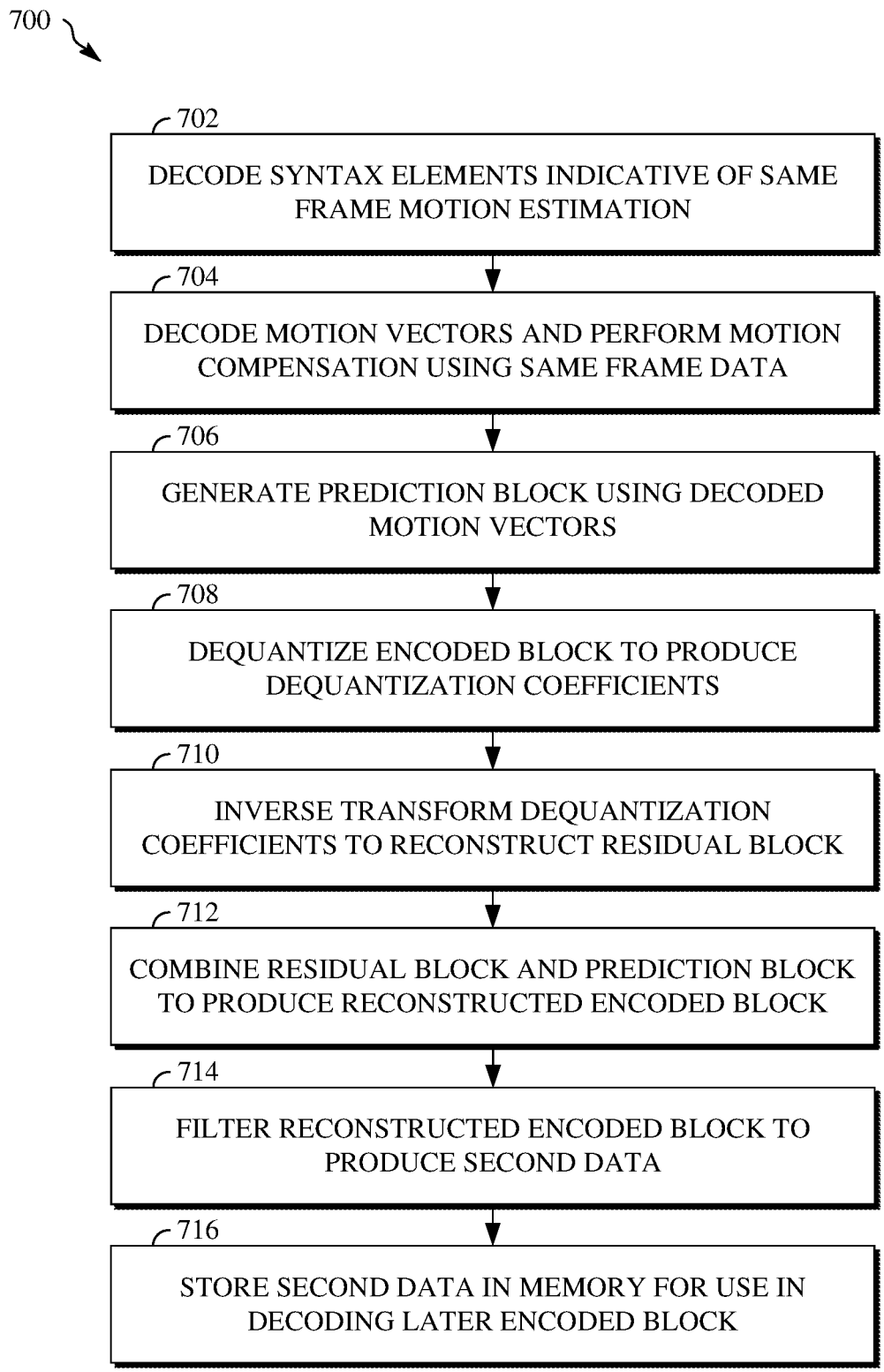
FIG. 7 is a flowchart diagram of an example of a technique for decoding an encoded block of an encoded video frame using same frame motion compensation.

Techniques for encoding or decoding video frames are now described with respect to FIGS. 6 and 7. FIG. 6 is a flowchart diagram of an example of a technique 600 for encoding a current block of a video frame using same frame motion estimation. FIG. 7 is a flowchart diagram of an example of a technique 700 for decoding a current block of a video frame using same frame motion compensation. One or both of the technique 600 or the technique 700 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform one or both of the technique 600 or the technique 700. One or both of the technique 600 or the technique 700 can be implemented using specialized hardware or firmware, for example, the hardware components 1000 and 1100 described below with respect to FIGS. 10 and 11. As explained above, some computing devices may have multiple memories or processors, and the operations described in the technique 600 and the technique 700 can be distributed using multiple processors, memories, or both.

For simplicity of explanation, the technique 600 and the technique 700 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 6, the technique 600 for encoding a current block of a video frame using same frame motion estimation is shown. At 602, a first set of motion vector candidates is identified by performing motion estimation based on data stored in a memory (e.g., a local SRAM, an external DRAM, or the like). The first set of motion vector candidates includes at least one motion vector that may be used to generate a prediction block for the current block. The video frame may be a key frame. Alternatively, the video frame may be an intra-frame, an inter-frame, or another type of video frame.

The data stored in the memory is associated with one or more encoded blocks preceding the current block within the video frame. As such, the data stored in the memory is stored in the memory subsequent to an encoding of the one or more encoded blocks. For example, a first block of the video frame may be predicted, transformed, quantized, reconstructed, and filtered. Subsequent to the filtering of the first block, data associated with the first block may be stored in the memory, such as for use in encoding a second block of the video frame. In that the data associated with the one or more encoded blocks is stored in a memory, the first set of motion vector candidates is identified without having to access a dynamic memory.

The one or more encoded blocks are located within the video frame but outside of a restricted area of the video frame. The restricted area refers to a portion of the video frame that is reserved for processing (e.g., such that pixel and/or block data located within the restricted area is not yet usable to encode the current block). For example, the restricted area may reflect a portion of the video frame that is reserved for encoder pipeline processing, loop filtering, or the like, or a combination thereof. Examples of the restricted area are described below with respect to FIG. 8. In that there will be more encoded blocks with each block that is processed using the technique 600, there may be more motion vectors in the first set of motion vector candidates as the technique 600 is used to encode blocks of a video frame.

At 604, a second set of motion vector candidates is identified by performing inter-prediction against at least one encoded block of at least one previously encoded video frame. The second set of motion vector candidates includes at least one motion vector that may be used to generate a prediction block for the current block. Operations for identifying motion vectors by performing inter-prediction are described above with respect to the intra/inter prediction stage 402 shown in FIG. 4.

At 606, at least one motion vector is selected from the first set of motion vector candidates, the second set of motion vector candidates, or both. Selecting the at least one motion vector can include determining rate-distortion values resulting from predicting the current block (e.g., using traditional intra-prediction or inter-prediction, or by identifying common image objects common to other video blocks, such as the one or more encoded blocks, within the video frame) for the ones of the motion vectors of the first set of motion vector candidates and the second set of motion vector candidates. A rate-distortion value refers to a function (e.g., a linear function) that balances an amount of distortion (e.g., a loss in video quality) with rate (e.g., a number of bits) for coding a block or other video component. Subsequent to determining the rate-distortion values, the motion vector candidate or candidates used to determine a lowest one or more of the rate-distortion values is or are selected.

At 608, a prediction residual block is determined for the current block. The prediction residual block is determined by generating a prediction block based on the selected at least one motion vector. The prediction residual block represents a difference between the current block to be encoded and the prediction block. Operations for determining a prediction residual block are described above with respect to the intra/inter prediction stage 402 shown in FIG. 4. At 610, the prediction residual block is transformed to produce transform coefficients. Transforming the prediction residual block can include applying a discrete cosine transform (DCT), asymmetric discrete sine transform (ADST), or other transform (or their approximations) to the coefficients of the prediction residual block to transform the coefficients of the prediction residual block into transform coefficients. Operations for transforming a prediction residual block are described above with respect to the transform stage 404 shown in FIG. 4.

At 612, the transform coefficients are quantized to produce quantization coefficients. The quantization coefficients represent quantized values of pixels reflected in the transformed prediction residual block. Operations for quantizing the transform coefficients are described above with respect to the quantization stage 406 shown in FIG. 4. At 614, the quantization coefficients are reconstructed to produce a reconstructed current block. The coefficients of the reconstructed current block reflects the coefficients of the pixels of the current block before the encoding thereof. Operations for reconstructing the current block are described above with respect to the reconstruction stage 414 shown in FIG. 4 (e.g., based on operations performed at the dequantization stage 410 and the inverse transform stage 412 shown in FIG. 4).

At 616, at least a portion of the reconstructed current block is filtered to produce data indicative of a video object associated with the reconstructed current block. The filtering can include applying one or more of a deblocking filter, an SAO filter, or another filter against one or more pixels of the reconstructed current block. Operations for filtering the reconstructed current block are described above with respect to the loop filter stage 416 shown in FIG. 4.

The video object may refer to an object texture or like visual aspect represented by the pixel values of the reconstructed current block (and, thus, the current block as received from an input video stream including the video frame). For example, when the selected motion vector used to determine the prediction residual block is selected from the first set of motion vector candidates such that the motion of the current block is estimated using motion estimation based on data stored in a memory, the video object may reflect an image pattern also present in one or more other blocks of the video frame. Alternatively, the video object may refer to motion within or otherwise associated with the reconstructed current block (and, thus, the current block). For example, when the selected motion vector used to determine the prediction residual block is selected from the second set of motion vector candidates such that the motion of the current block is predicted using inter-prediction based on reference frames, the video object may reflect motion demonstrated using the selected motion vector.

At 618, the data indicative of the video object associated with the reconstructed current block is stored with the in the memory for use in encoding a video block following the current block within the video frame. Storing the data can include storing one or more of the transform coefficients of the current block, the motion vector selected for encoding the current block, data indicative of the video object represented by the pixel values of the current block, or the like, or a combination thereof, within the same frame memory from which the data was received for identifying the first set of motion vector candidates.

In some implementations, the technique 600 includes encoding one or more syntax elements to a header of the video frame within a bitstream to which the current block is encoded. The one or more syntax elements indicate that the first data stored in the same frame memory was used to encode the current block. The one or more syntax elements may, for example, include one or more bits encoded to a frame header of the video frame. Alternatively, the one or more syntax elements may be encoded to a slice header, tile header, or other header associated with the video frame including the current block that was encoded using the first data. The one or more syntax elements reflect that the motion vector selected for encoding the current block was selected from the video frame that includes the current block. However, in some cases, such as where the video frame that includes the current block is a key frame, the technique 600 may omit encoding syntax elements to a header of the video frame.

In some implementations, the technique 600 can include updating a context model to reflect that a motion vector identified based on same frame data stored in a memory was used to encode the current block. For example, the context model updated based on the use of such an identified motion vector may be different from context models used for traditional motion vectors (e.g., those identified from traditional inter-prediction or intra-prediction). Such a context model reflects the statistics of using same frame data to encode a current block, for example, a probability of same frame data being optimal for encoding a current block.

Furthermore, the entropy coding of a selected motion vector pointing to a same frame memory may otherwise be different from the entropy coding of a traditional motion vector. For example, in cases where spatial neighbor information is not available for identifying a motion vector predictor within the video frame for entropy coding a selected motion vector pointing to a same frame memory, motion estimation may be performed within the video frame using a spatial neighbor to provide a motion vector predictor. In another example, in that motion vectors pointing to the same frame need to observe boundary constraints distinct from those for motion vectors pointing to a different video frame, there may be range limits observed for the entropy coding of same frame motion vectors.

In some implementations, the first set of motion vector candidates includes motion vector candidates identified by performing motion estimation against video blocks of one or more reference frames. For example, in bi-directional prediction modes, the encoded blocks usable to perform the motion estimation can be used as one of the reference frames. One or more other reference frames, for example, past frames or future frames, may also be used. In some implementations, the first set of motion vector candidates may include regular motion vectors and/or irregular motion vectors, for example, motion vectors indicating sub-pixel interpolation, motion warping, or like image changes are used. In some implementations, generating the prediction block can include using intra-prediction in addition to or instead of inter-prediction (e.g., for identifying the first and second sets of motion vectors). Operations for generating a prediction block based using intra-prediction are described above with respect to the intra/inter prediction stage 402 shown in FIG. 4.

In some implementations, the technique 600 can be performed to parallel encode current blocks within respective tiles of the video frame. Examples of parallel encoding using tiles is described below with respect to FIG. 9. In some implementations, the technique 600 can omit the filtering at 616.

Referring next to FIG. 7, the technique 700 for decoding an encoded block of an encoded video frame using same frame motion compensation is shown. At 702, one or more syntax elements are decoded from a bitstream to which the encoded block and encoded video frame are encoded. The one or more syntax elements indicate to decode the encoded block by performing motion compensation against one or more reconstructed blocks of the encoded video frame. That is, the one or more syntax elements may reflect that the encoded block was encoded by performing motion estimation against data representing reconstructed and filtered blocks preceding the encoded block within the encoded video frame.

At 704, motion vectors are decoded from the bitstream and motion compensation is performed based on data stored in a memory (e.g., a local SRAM, an external DRAM, or the like). The motion vectors include at least one motion vector that may be used to generate a prediction block for the encoded block. The encoded video frame may be a key frame. Alternatively, the encoded video frame may be an intra-frame, an inter-frame, or another type of video frame.

The data stored in the memory is associated with one or more decoded blocks preceding the encoded block within the encoded video frame. As such, the data stored in the memory is stored in the memory subsequent to a decoding of the one or more decoded blocks. For example, a first encoded block of the video frame may be entropy decoded, dequantized, inverse transformed, predicted, reconstructed, and filtered. Subsequent to the filtering of the first encoded block, data associated with the first encoded block may be stored in the memory, such as for use in decoding a second encoded block of the encoded video frame. In some implementations where the data associated with the one or more decoded blocks is stored in a memory, the at least one motion vector can be decoded without having to access a dynamic memory.

The one or more decoded blocks are located within the encoded video frame but outside of a restricted area of the encoded video frame. The restricted area refers to a portion of the encoded video frame that is reserved for processing (e.g., such that pixel and/or block data located within the restricted area is not yet usable to decode the encoded block). For example, the restricted area may reflect a portion of the encoded video frame that is reserved for decoder pipeline processing, loop filtering, or the like, or a combination thereof. Examples of the restricted area are described below with respect to FIG. 8. In that there will be more decoded blocks with each encoded block that is processed using the technique 700, there may be more motion vectors available as the technique 700 is used to decode encoded blocks of an encoded video frame.

At 706, a prediction block is generated for the encoded block using the decoded at least one motion vector. Operations for generating a prediction block are described above with respect to the intra/inter prediction stage 508 shown in FIG. 5. At 708, and separately from the selecting of the at least one motion vector and generating of the prediction block, coefficients of the encoded block are dequantized to produce dequantization coefficients. The dequantization coefficients represent dequantized values of pixels reflected in the encoded block, such as based on transformation and prediction applied during encoding. Operations for dequantizing the coefficients of the encoded block are described above with respect to the dequantization stage 504 shown in FIG. 5.

At 710, the dequantization coefficients are inverse transformed to reconstruct a prediction residual block. Inverse transforming the dequantization coefficients can include applying a DCT, ADST, or other inverse transform to the coefficients of the dequantized encoded block to transform the coefficients of the dequantized encoded block into the prediction residual block. Operations for inverse transforming a dequantized encoded block are described above with respect to the inverse transform stage 506 shown in FIG. 5. At 712, the prediction residual block is combined with the prediction block generated using the decoded at least one motion vector to produce a reconstructed block. The coefficients of the reconstructed block reflect the coefficients of the pixels of the encoded block before the encoding thereof. Operations for reconstructing the encoded block are described above with respect to the reconstruction stage 510 shown in FIG. 5.

At 714, at least a portion of the reconstructed block is filtered to produce data indicative of a video object associated with the reconstructed block. The filtering can include applying one or more of a deblocking filter, an SAO filter, or another filter against one or more pixels of the reconstructed current block. Operations for filtering the reconstructed block are described above with respect to the loop filter stage 512 shown in FIG. 5.

The video object may refer to an object texture or like visual aspect represented by the pixel values of the reconstructed current block (and, thus, the current block as received from an input video stream including the video frame). For example, when the decoded motion vector used to generate the prediction block is identified using motion estimation based on same frame data stored in a memory, the video object may reflect an image pattern also present in one or more other blocks of the video frame. Alternatively, the video object may refer to motion within or otherwise associated with the reconstructed current block (and, thus, the current block). For example, when the decoded motion vector used to generate the prediction block is identified using inter-prediction based on reference frames, the video object may reflect motion demonstrated using the selected motion vector.

At 716, the data indicative of the video object associated with the reconstructed block is stored in the memory for use in decoding a video block following the encoded block within the encoded video frame. Storing the data can include storing one or more of the reconstructed coefficients of the reconstructed block, the motion vector selected for decoding the encoded block, data indicative of the video object represented by the pixel values of the encoded block, or the like, or a combination thereof, within the same frame memory from which the data was received. This data may later be referred to as same frame data or the like.

In some implementations, the technique 700 can include updating a context model to reflect that a motion vector identified based on same frame data stored in a memory was used to decode the encoded block. For example, the context model updated based on the use of such a decoded motion vector may be different from context models used for traditional motion vectors (e.g., those identified from traditional inter-prediction or intra-prediction). Such a context model reflects the statistics of using same frame data to decode an encoded block, for example, a probability of same frame data being optimal for decoding an encoded block.

Furthermore, the entropy coding of a motion vector pointing to a same frame memory may otherwise be different from the entropy coding of a traditional motion vector. For example, in cases where spatial neighbor information is not available for identifying a motion vector predictor within the encoded video frame for entropy coding of a motion vector pointing to a same frame memory, motion estimation may be performed within the video frame using a spatial neighbor to provide a motion vector predictor. In another example, in that motion vectors pointing to the same frame need to observe boundary constraints distinct from those for motion vectors pointing to a different encoded video frame, there may be range limits observed for the entropy coding of same frame motion vectors.

In some implementations, the prediction block may be generated after the dequantizing and inverse transforming. In some implementations, the prediction block may be generated simultaneously or nearly simultaneous to the dequantizing and inverse transforming.

In some implementations, the decoded motion vectors include motion vectors identified by performing motion estimation against video blocks of one or more reference frames. For example, in bi-directional prediction modes, the decoded blocks usable to perform the motion estimation can be used as one of the reference frames. One or more other reference frames, for example, past frames or future frames, may also be used. In some implementations, the decoded motion vectors may include regular motion vectors and/or irregular motion vectors, for example, motion vectors indicating sub-pixel interpolation, motion warping, or like image changes are used.

In some implementations, the technique 700 can be performed to parallel decode encoded blocks within respective tiles of the encoded video frame. Examples of parallel decoding using tiles is described below with respect to FIG. 9. In some implementations, the technique 700 can omit the filtering at 714.

Figure 8:
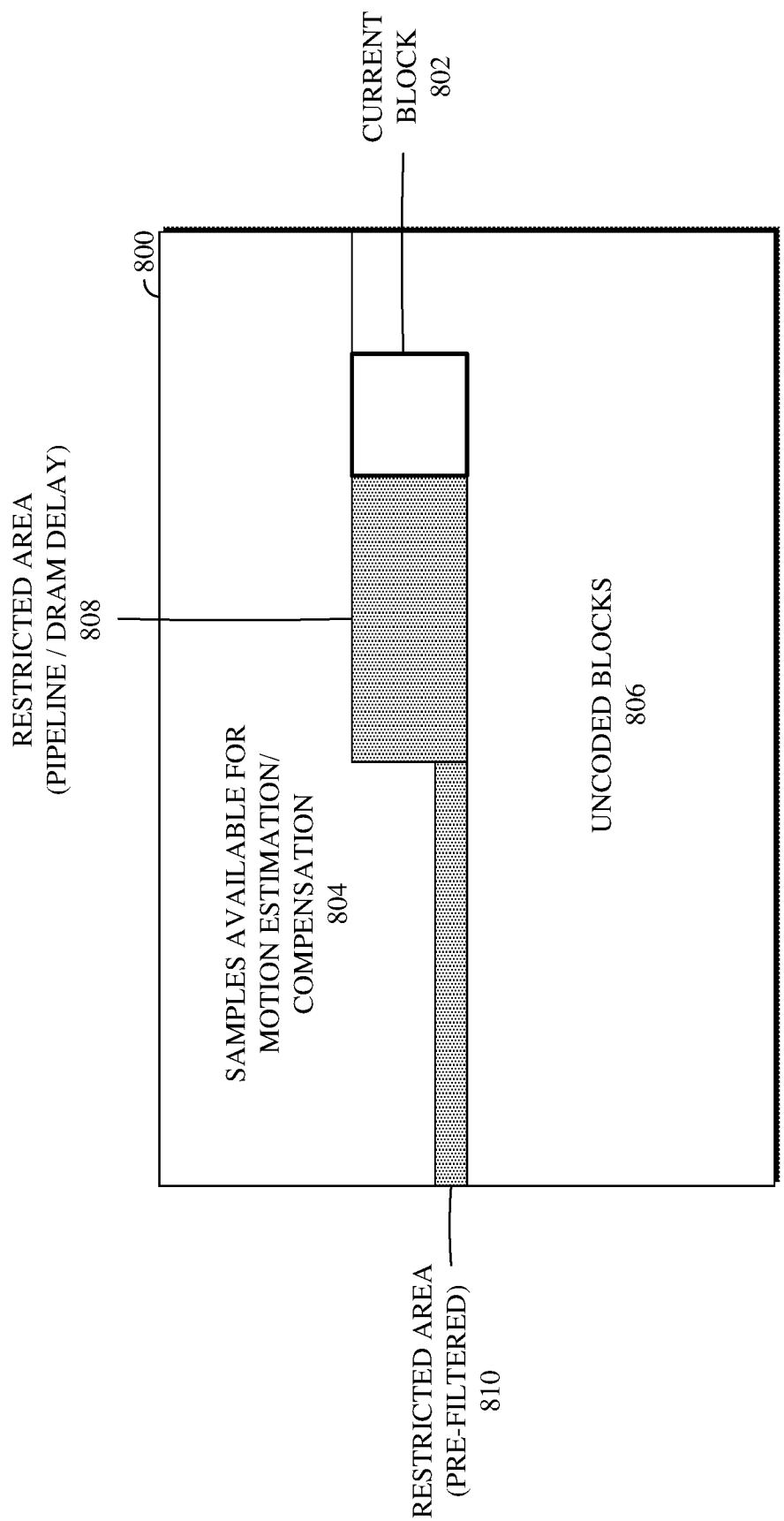
FIG. 8 is an illustration of a video frame including a current block coded using same frame motion estimation and compensation.

FIG. 8 is an illustration of a video frame 800 including a current block 802 coded using same frame motion estimation and compensation. The video frame 800 includes a number of samples available for motion estimation or compensation 804 that have been coded before the current block 802. The video frame 800 also includes a number of uncoded blocks 806 that will be coded after the current block 802 is coded. The coding (e.g., encoding or decoding, as applicable) current block 802 can include using one or more of the samples available for motion estimation or compensation 804 to determine a prediction block for the current block 802.

For example, data associated with the samples available for motion estimation or compensation 804 may be stored in a memory (e.g., a local SRAM, an external DRAM, or the like) of a hardware component for coding the current block. The data stored in that memory can be used to perform motion estimation (e.g., during encoding) or motion compensation (e.g., during decoding) to identify motion vector candidates or otherwise decode motion vectors that may be used to predict motion of the current block. The samples available for motion estimation or compensation 804 may include blocks that have already been coded for the video frame 800. The data associated with the samples available for motion estimation or compensation 804 may be stored within the memory subsequent to respective ones of the blocks of the video frame 800 being coded. As such, as more blocks are coded, the size of the portion of the video frame 800 that includes the samples available for motion estimation and compensation 804 increases.

The current frame 800 includes one or more restricted areas from which data is not used to code the current block 802. The one or more restricted areas precede the current block 802 within the current frame 800 (e.g., according to a scan order for coding the video blocks of the current frame 800, for example, raster scan). For example, a restricted area 808 reflects a portion of the current frame 800 that may still be under process when the current block 802 is ready for coding. The restricted area 808 may account for operational delay of an encoder or decoder, for example, delay caused by internal pipeline processing, output buffering, lossless frame compression, system memory architecture, or the like. The restricted area 808 may have a size associated with partition sizes for the current frame 800. For the current block 802 of size N×N, the restricted area 808 may be N pixels in height and M pixels in width (e.g., where M is a multiple of N). For example, where the current block 802 is a 64×64 coding unit, the restricted area 808 may be 64 pixels in height and 192 pixels in width.

In another example, a restricted area 810 reflects a portion of the current frame 800 that will be processed by filtering. The restricted area 810 may account for processing by loop filters (e.g., deblocking filters, SAO filters, or the like). The restricted area 810 includes pixels in N rows at the bottom of an entire video block row (e.g., a row of video blocks that includes the current block 802 within the current frame 800). The number of rows N is based on the number of pixel lines that cannot be processed until corresponding lower neighbor video blocks of the corresponding video block row are reconstructed. For example, the restricted area 810 may include three rows of pixels. In some cases, the restricted area 810 may overlap with the restricted area 808. In some cases, the restricted area 810 may be omitted, for example, when loop filtering, including, but not limited to, deblocking, Constrained Directional Enhancement Filter (CDEF) application, and loop restoration, is not enabled for the current frame 800. In general, the restricted area 810 may depend upon what the loop filtering is and how the loop filtering is used.

Figure 9:
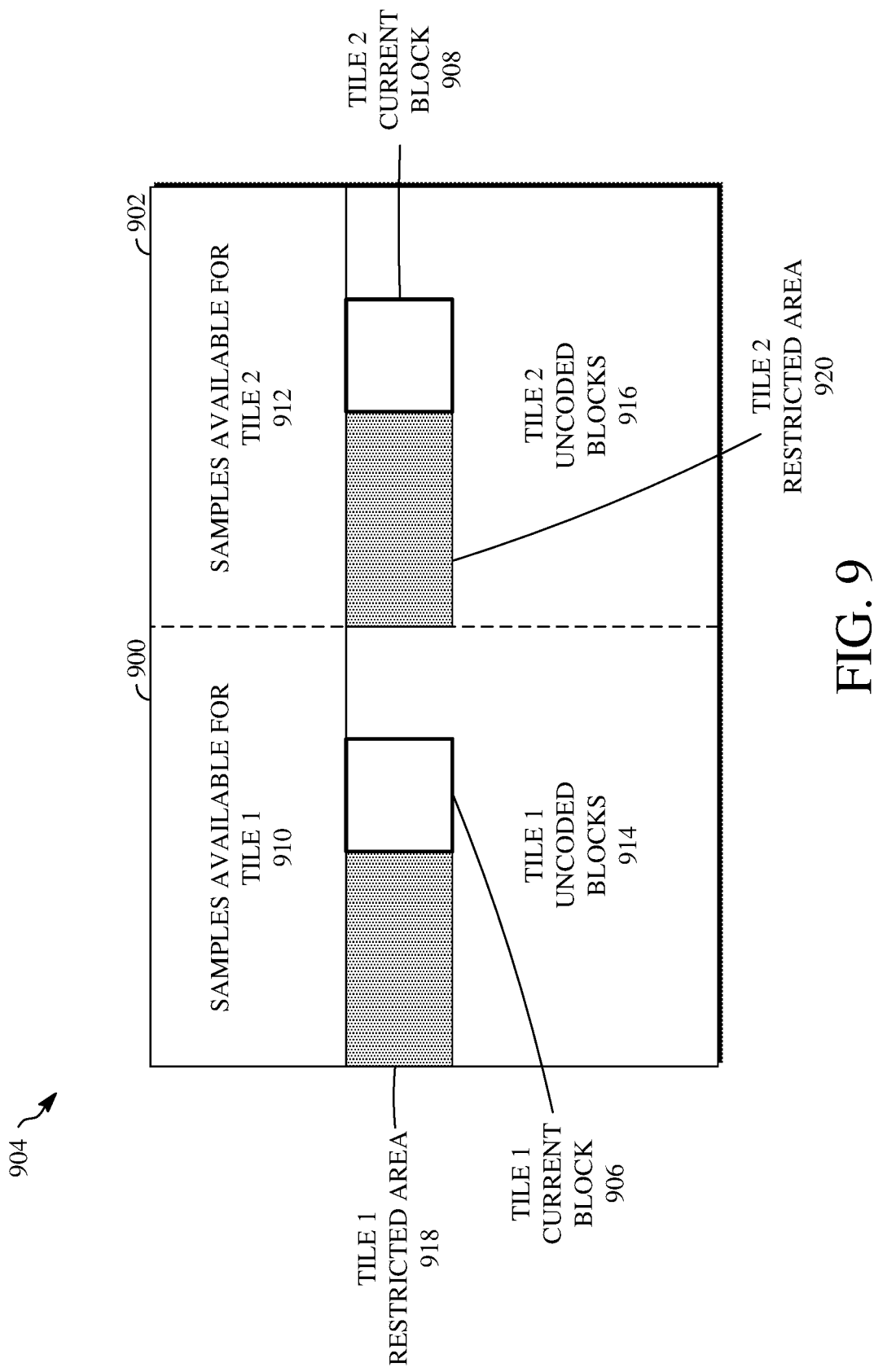
FIG. 9 is an illustration of tiles of a video frame including current blocks parallel coded using same frame motion estimation and compensation.

FIG. 9 is an illustration of tiles 900, 902 of a video frame 904 including current blocks 906, 908 parallel coded using same frame motion estimation and compensation. In some cases, an encoder or decoder used to code the video frame 904 may not support coding video blocks in a parallel wavefront fashion. This may be, for example, to prevent situations where a motion vector pointing in a direction not yet available per the parallel coding order is sought to be used to code a video block. In such a case, the video frame 904 can be divided into tiles, such as the tiles 900, 902, to enable parallel wavefront coding of video blocks.

Each of the tiles 900, 902 includes samples available for motion estimation or compensation 910, 912, at least some of which may, for example, be the samples available for motion estimation or compensation 804 shown in FIG. 8. Each of the tiles 900, 902 includes uncoded blocks 914, 916, at least some of which may, for example, be the uncoded blocks 806 shown in FIG. 8. Each of the tiles 900, 902 includes a restricted area 918, 920, at least a portion of which may, for example, be one or both of the restricted area 808 or the restricted area 810 shown in FIG. 8. The coding of video blocks using independent tiles 900, 902 may allow for motion vectors pointing in various directions to be used for motion estimation or compensation, and, therefore, to determine a prediction residual block for the current blocks 906, 908.

Figure 10:
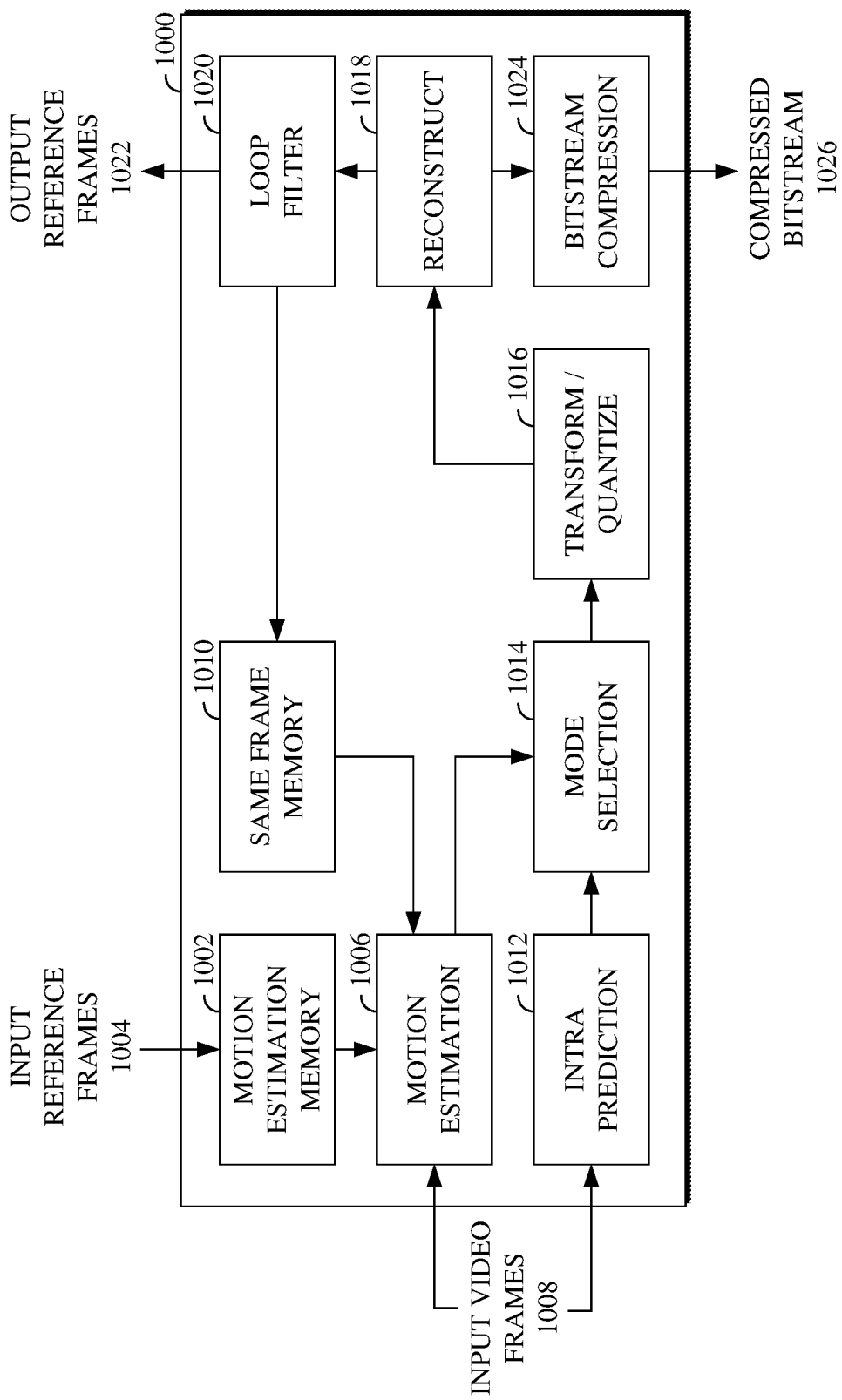
FIG. 10 is a block diagram of a hardware component configured for encoding a current block of a video frame using same frame motion estimation.

FIG. 10 is a block diagram of a hardware component 1000 configured for encoding a current block of a video frame using same frame motion estimation. The hardware component 1000 may, for example, be an implementation of the encoder 400 shown in FIG. 4. For example, the hardware component 1000 may be a hardware component configured to perform the technique 600 shown in FIG. 6. The hardware component 1000 may be a hardware component of a transmitting station, for example, the transmitting station 102 shown in FIG. 1.

The hardware component 1000 includes a motion estimation memory 1002 that receives one or more input reference frames 1004. In some implementations, the motion estimation memory 1002 may be a local SRAM. In such an implementation, the input reference frames 1004 are received by the hardware component 1000 for motion estimation within a local SRAM without the hardware component 1000 having to access a DRAM. Alternatively, the motion estimation memory 1002 may be a DRAM external to the hardware component 1000 or another form of memory. The hardware component 1000 performs motion estimation 1006 against a current video frame to encode as one or more input video frames 1008 received by the hardware component 1000. The motion estimation 1006 processes the current video frame based on data output from the motion estimation memory 1002 and data output from a same frame memory 1010. The same frame memory 1010 includes data associated with video blocks that have already been encoded (e.g., reconstructed blocks) within the current video frame to encode. The same frame memory 1010 may, for example, be a local SRAM, a DRAM external to the hardware component 1000, or another form of memory. In at least some cases, the motion estimation memory 1002 and the same frame memory 1010 may be the same memory unit.

The hardware component 1000 separately performs intra prediction 1012 against the current video frame received as one of the input video frames 1008. Motion data (e.g., prediction residuals) resulting from the motion estimation 1006 and from the intra prediction 1012 are fed into a mode selection 1014 that selects the data resulting from the motion estimation 1006 or the data resulting from the intra prediction 1012 as the motion data to use to encode a next video block of the current video frame. For example, the mode selection 1014 can perform a rate-distortion analysis against the motion data resulting from the motion estimation 1006 and the motion data resulting from the intra prediction 1012. The prediction residual data selected by the mode selection 1014 is then output for transformation and quantization 1016. After the transformation and quantization 1016, the current block is reconstructed at reconstruction 1018 to produce a reconstructed current block.

The reconstructed current block may then be filtered, for example, using loop filtering 1020. The output of the loop filtering 1020 is used to indicate output reference frames 1022 that may later be used to predict other ones of the input video frames 1008 to be processed. The output of the loop filtering 1020 is also fed back into the same frame memory 1010 for later use in processing by the motion estimation 1006. As such, data associated with a current block of one of the input video frames 1008 being encoded using the hardware component 1000 can be used to encode a later block within that one of the input video frames 1008, such as by that data being used from the same frame memory 1010 to perform a motion estimation 1006 for that later block.

The data associated with the current block may also, subsequent to the reconstruction 1018, be processed within bitstream compression 1024 and output to a compressed bitstream 1026. The bitstream compression 1024 may, for example, include entropy encoding and/or other operations for encoding the data to the compressed bitstream 1026. The compressed bitstream 1026 is then output to a server for storage, a receiving station (e.g., the receiving station 106 shown in FIG. 1) for decoding, or the like.

Implementations of the hardware component 1000 may differ from those described above. In some implementations, an additional memory may be used by the hardware component 1000 to store data associated with video blocks encoded using the hardware component 1000. Those video blocks may, for example, be the last video blocks against which a predictor search can be performed within the video frame (e.g., based on restricted areas within the video frame). Using this additional memory would thus allow for an extra video frame of motion search to be added without a DRAM bandwidth increase.

In some implementations, the hardware component 1000 may omit the loop filtering 1020. In some implementations, the data output by the transformation and quantization 1016 may be entropy encoded and output to the compressed bitstream 1026 without first being reconstructed. In some implementations, the hardware component 1000 may include functionality for decoding an encoded block, for example, by performing all or a portion of the technique 700. For example, the hardware component 1000 may include the functionality described below with respect to the hardware component 1100 shown in FIG. 11. In another example, the hardware component 1000 and the hardware component 1100 may be a single hardware component.

Figure 11:
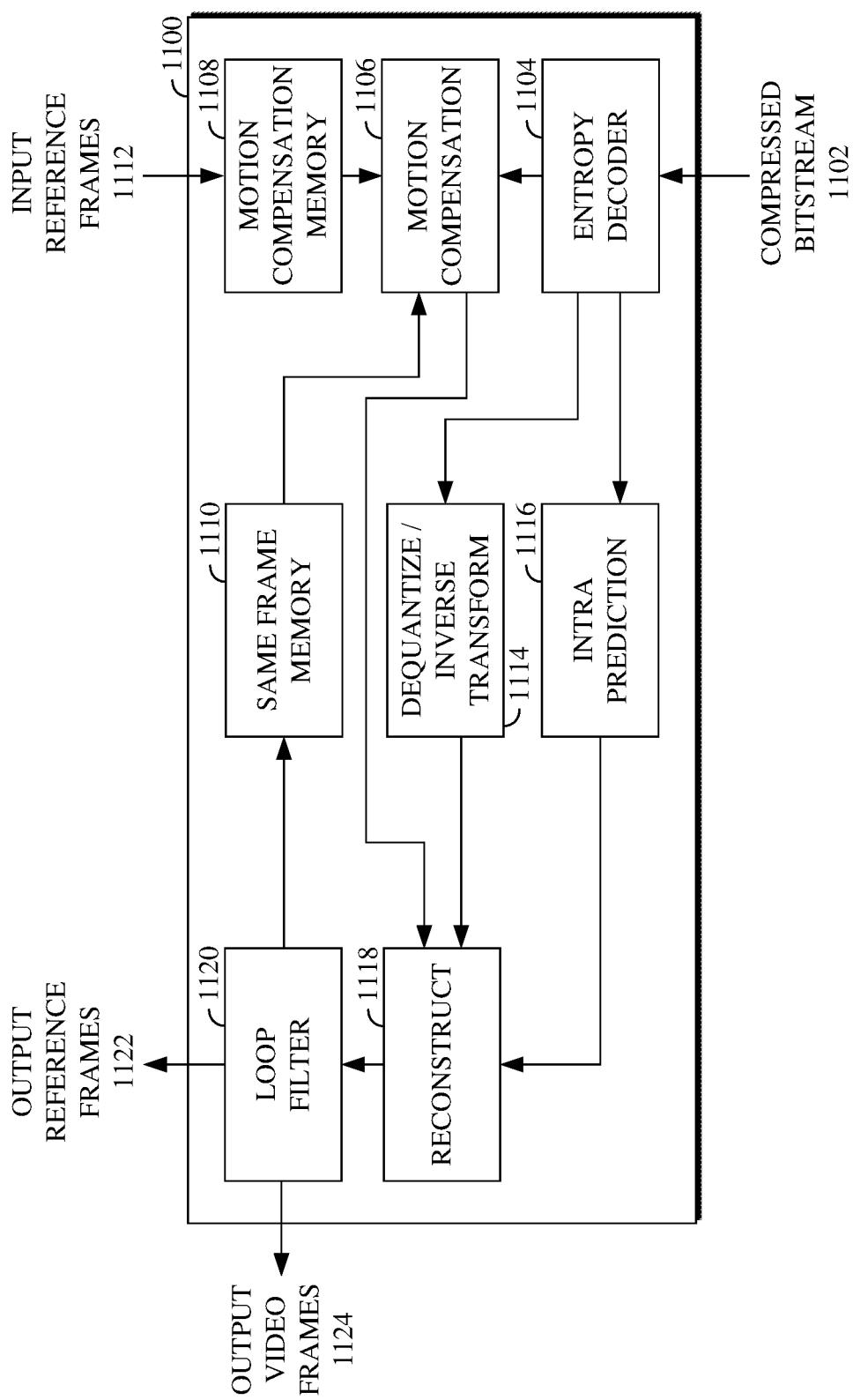
FIG. 11 is a block diagram of a hardware component configured for decoding an encoded block of an encoded video frame using same frame motion compensation.

FIG. 11 is a block diagram of a hardware component 1100 configured for decoding an encoded block of an encoded video frame using same frame motion compensation. The hardware component 1100 may, for example, be an implementation of the decoder 500 shown in FIG. 5. For example, the hardware component 1100 may be a hardware component configured to perform the technique 700 shown in FIG. 7. The hardware component 1100 may be a hardware component of a receiving station, for example, the receiving station 106 shown in FIG. 1.

The hardware component 1100 receives a compressed bitstream 1102, which may, for example, be the compressed bitstream 1026 shown in FIG. 10. The compressed bitstream 1102 includes data associated with one or more encoded frames of an encoded video stream. The compressed bitstream 1102 is first processed using an entropy decoder 1104. Motion compensation 1106 is then performed against the entropy decoded data. The motion compensation 1106 is performed using data from motion compensation memory 1108 and using data output from a same frame memory 1110. The motion compensation memory 1108 receives one or more input reference frames 1112. In some implementations, the input reference frames 1112 may be received by the hardware component 1100 for motion compensation within a local SRAM without the hardware component 1100 having to access a DRAM. The same frame memory 1110 includes data associated with encoded blocks that have already been decoded within the encoded video frame to decode. One or both of the motion compensation memory 1108 or the same frame memory 1110 may be a local SRAM, a DRAM external to the hardware component 1100, or another form of memory. In at least some cases, the motion compensation memory 1108 and the same frame memory 1110 may be the same memory unit.

The hardware component 1100 separately outputs the entropy decoded data associated with the encoded block for dequantization and inverse transformation 1114. After the dequantization and inverse transformation 1114, the encoded block is reconstructed at reconstruction 1118 to produce a reconstructed block. The hardware component 1100 further separately performs intra prediction 1116 against the encoded video frame received within the compressed bitstream 1102 (e.g., based on one or more already decoded blocks within the encoded video frame). Motion data (e.g., prediction blocks) resulting from the motion compensation 1106 and from the intra prediction 1116 are received and used by the reconstruction 1118, such as to reconstruct the encoded block.

The reconstructed block is then filtered, for example, using loop filtering 1120. The output of the loop filtering 1120 is used to indicate output reference frames 1122 that may later be used to predict other encoded blocks and encoded video frames from the compressed bitstream 1102. The output of the loop filtering 1120 is also fed back into the same frame memory 1110 for later use in processing by the motion compensation 1106. As such, data associated with an encoded block of an encoded video frame being decoded from the compressed bitstream 1102 using the hardware component 1100 can be used to decode a later encoded block within that encoded video frame, such as by that data being used from the same frame memory 1110 to perform a motion compensation 1106 for that later block. The data associated with the encoded block may also, subsequent to the loop filtering 1120, be output to one or more output video frames 1124, such as for display as part of an output video stream.

Implementations of the hardware component 1100 may differ from those described above. In some implementations, an additional memory may be used by the hardware component 1100 to store data associated with encoded blocks decoded using the hardware component 1100. Those encoded blocks may, for example, be the last encoded blocks against which a predictor search can be performed within the encoded frame (e.g., based on restricted areas within the encoded frame). Using this additional memory would thus allow for an extra video frame of motion search to be added, for example, without a DRAM bandwidth increase.

In some implementations, the hardware component 1100 may include functionality for encoding a video block, for example, by performing all or a portion of the technique 600. For example, the hardware component 1100 may include the functionality described above with respect to the hardware component 1000 shown in FIG. 10. In another example, the hardware component 1000 and the hardware component 1100 may be a single hardware component.

The aspects of encoding and decoding described above illustrate some examples of encoding and decoding techniques and hardware components configured to perform all or a portion of those examples of encoding and/or decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean a natural inclusive permutation thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware (e.g., the hardware component 1000 and/or the hardware component 1100) can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for encoding a current block of a current video frame of a video sequence, the method comprising:

identifying a first set of motion vector candidates by performing motion estimation based on first data stored in a local static memory of a hardware encoder used for encoding the current video frame, the first data associated with one or more encoded blocks preceding the current block within the current video frame, the first data stored in the memory subsequent to an encoding of the one or more encoded blocks, wherein at least one motion vector candidate of the first set of motion vector candidates is an irregular motion vector indicative of a motion warping associated with the one or more encoded blocks;

identifying a second set of motion vector candidates by performing inter-prediction against at least one encoded block of at least one previously encoded video frame of the video sequence;

selecting at least one motion vector from at least one of the first set of motion vector candidates or the second set of motion vector candidates, the at least one motion vector including the irregular motion vector;

determining a prediction residual block for the current block using a prediction block generated based on the selected at least one motion vector;

transforming the prediction residual block to produce transform coefficients;

quantizing the transform coefficients to produce quantization coefficients;
reconstructing the quantization coefficients to produce a reconstructed current block of the current video frame; and
storing second data in the local static memory for use in encoding a video block following the current block within the current video frame, the second data corresponding to a visual aspect of the video sequence represented by pixel values of the reconstructed current block of the current video frame.

2. The method of claim 1, wherein the one or more encoded blocks are outside of a restricted area of the current video frame, the restricted area corresponding to a portion of the current video frame reserved for encoder pipeline processing.

3. The method of claim 1, wherein the first set of motion vector candidates is identified without accessing a dynamic memory of the hardware encoder.

4. The method of claim 1, wherein the selected at least one motion vector is selected from the first set of motion vector candidates, the method further comprising:
encoding one or more syntax elements to a header of the current video frame within a bitstream to which the current block is encoded, the one or more syntax elements indicating that the first data was used to encode the current block.

5. The method of claim 1, wherein the first set of motion vector candidates is identified using both of the first data stored in the local static memory and one or more reference frames, and wherein the first set of motion vector candidates includes one or more motion vector candidates identified by performing motion estimation against video blocks of the one or more reference frames.

6. The method of claim 1, further comprising:
filtering at least a portion of the reconstructed current block to produce the second data.

7. An apparatus for encoding a current block of a current video frame of a video sequence, the apparatus comprising:
a local static memory configured to store first data associated with one or more encoded blocks preceding the current block within the video frame subsequent to an encoding of the one or more encoded blocks; and
a processor configured to execute instructions stored in a non-transitory storage medium to:
identify a first set of motion vector candidates by performing motion estimation based on first data stored in the local static memory, wherein at least one motion vector candidate of the first set of motion vector candidates is an irregular motion vector indicative of a motion warping associated with the one or more encoded blocks;
identify a second set of motion vector candidates by performing inter-prediction against at least one encoded block of at least one previously encoded video frame of the video sequence;
select at least one motion vector from at least one of the first set of motion vector candidates or the second set of motion vector candidates, the at least one motion vector including the irregular motion vector;
determine a prediction residual block for the current block using a prediction block generated based on the selected at least one motion vector;
transform the prediction residual block to produce transform coefficients;
quantize the transform coefficients to produce quantization coefficients;
reconstruct the quantization coefficients to produce a reconstructed current block of the current video frame; and
store second data in the local static memory for use in encoding a video block following the current block within the current video frame, the second data corresponding to a visual aspect of the video sequence represented by pixel values of the reconstructed current block of the current video frame.

8. The apparatus of claim 7, wherein the one or more encoded blocks are outside of a restricted area of the current video frame, the restricted area corresponding to a portion of the current video frame reserved for encoder pipeline processing.

9. The apparatus of claim 7, further comprising a dynamic memory, wherein the first set of motion vector candidates is identified without accessing the dynamic memory.

10. The apparatus of claim 7, wherein the selected at least one motion vector is selected from the first set of motion vector candidates, wherein the instructions include instructions to:
encode one or more syntax elements to a header of the current video frame within a bitstream to which the current block is encoded, the one or more syntax elements indicating that the first data was used to encode the current block.

11. The apparatus of claim 7, wherein the first set of motion vector candidates is identified using both of the first data stored in the local static memory and one or more reference frames, and wherein the first set of motion vector candidates includes one or more motion vector candidates identified by performing motion estimation against video blocks of one or more reference frames.

12. The apparatus of claim 7, wherein the instructions include instructions to:
filter at least a portion of the reconstructed current block to produce the second data.

13. A method for encoding a current block of a current video frame of a video sequence, the method comprising:
storing, in a local static memory of a hardware encoder used to encode the current video frame, first data associated with one or more previously encoded blocks of the current video frame;
selecting at least one motion vector from at least one of a first set of motion vector candidates identified by performing motion estimation based on the first data stored in the local static memory of the hardware encoder or a second set of motion vector candidates identified by performing inter-prediction against at least one encoded block of at least one previously encoded video frame of the video sequence, wherein the at least one motion vector includes at least one irregular motion vector indicative of a motion warping;
encoding the current block of the current video frame using the at least one motion vector; and
storing, in the local static memory of the hardware encoder, second data corresponding to a visual aspect of the video sequence represented by pixel values of the encoded current block of the current video frame, wherein the hardware encoder is configured to use the second data to encode one or more other video blocks of the current video frame.

14. The method of claim 13, wherein the one or more encoded blocks are outside of a restricted area of the current video frame, the restricted area corresponding to a portion of the current video frame reserved for encoder pipeline processing.

15. The method of claim 13, wherein the set of motion vector candidates is identified without accessing a dynamic memory of the hardware encoder.

16. The method of claim 13, further comprising:
- encoding one or more syntax elements to a header of the current video frame within a bitstream to which the current block is encoded, the one or more syntax elements indicating that the first data was used to encode the current block.

17. The method of claim 13, wherein encoding the current block of the current video frame using the at least one motion vector comprises:
- determining a prediction residual block for the current block using a prediction block generated based on the at least one motion vector;
- transforming the prediction residual block to produce transform coefficients;
- quantizing the transform coefficients to produce quantization coefficients;
- reconstructing the quantization coefficients to produce a reconstructed current block; and
- filtering at least a portion of the reconstructed current block to produce the second data.

18. The method of claim 13, wherein the current video frame is a key frame.

* * * * *